T. FRISCHMANN.
BREAD MAKING MACHINE.
APPLICATION FILED OCT. 3, 1911.
1,057,231.
Patented Mar. 25, 1913.
2 SHEETS—SHEET 1.
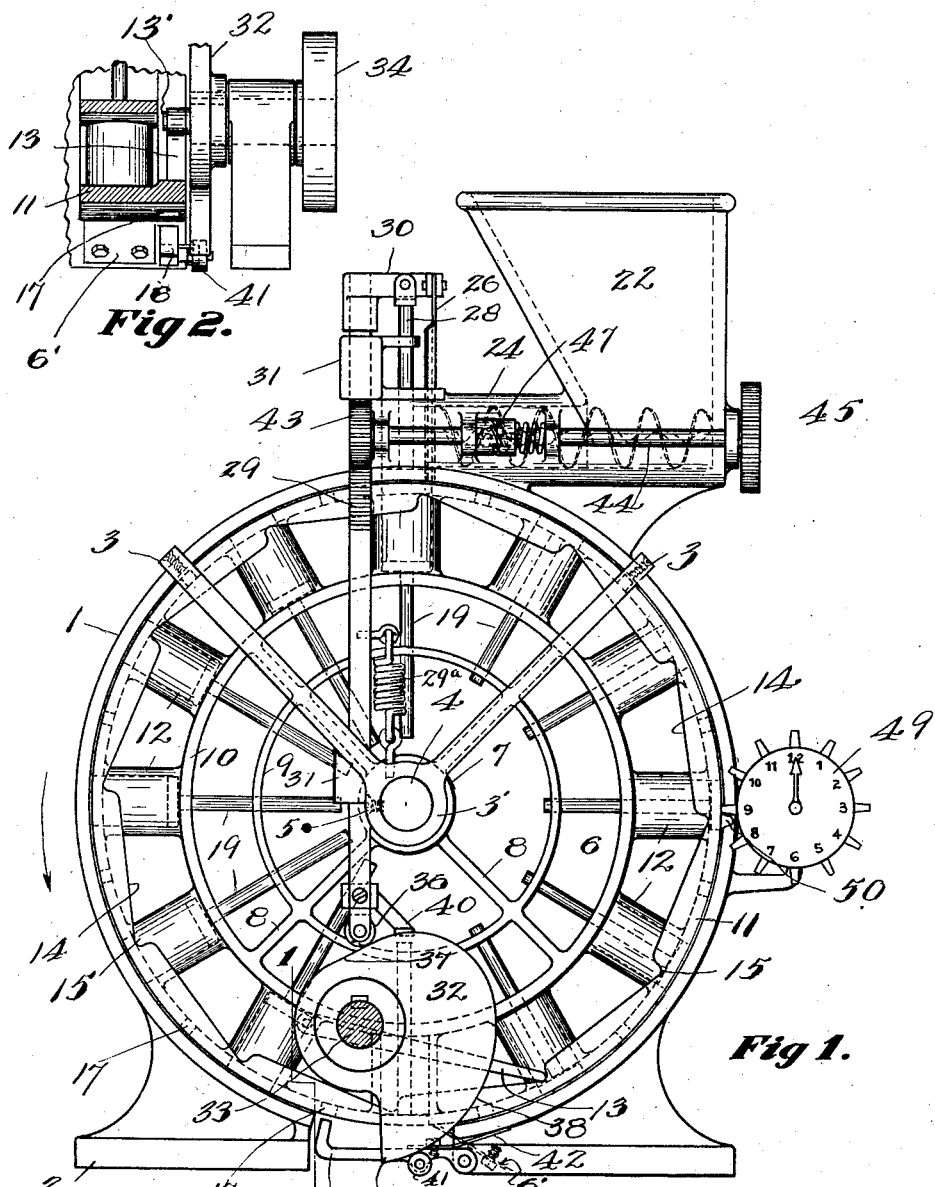

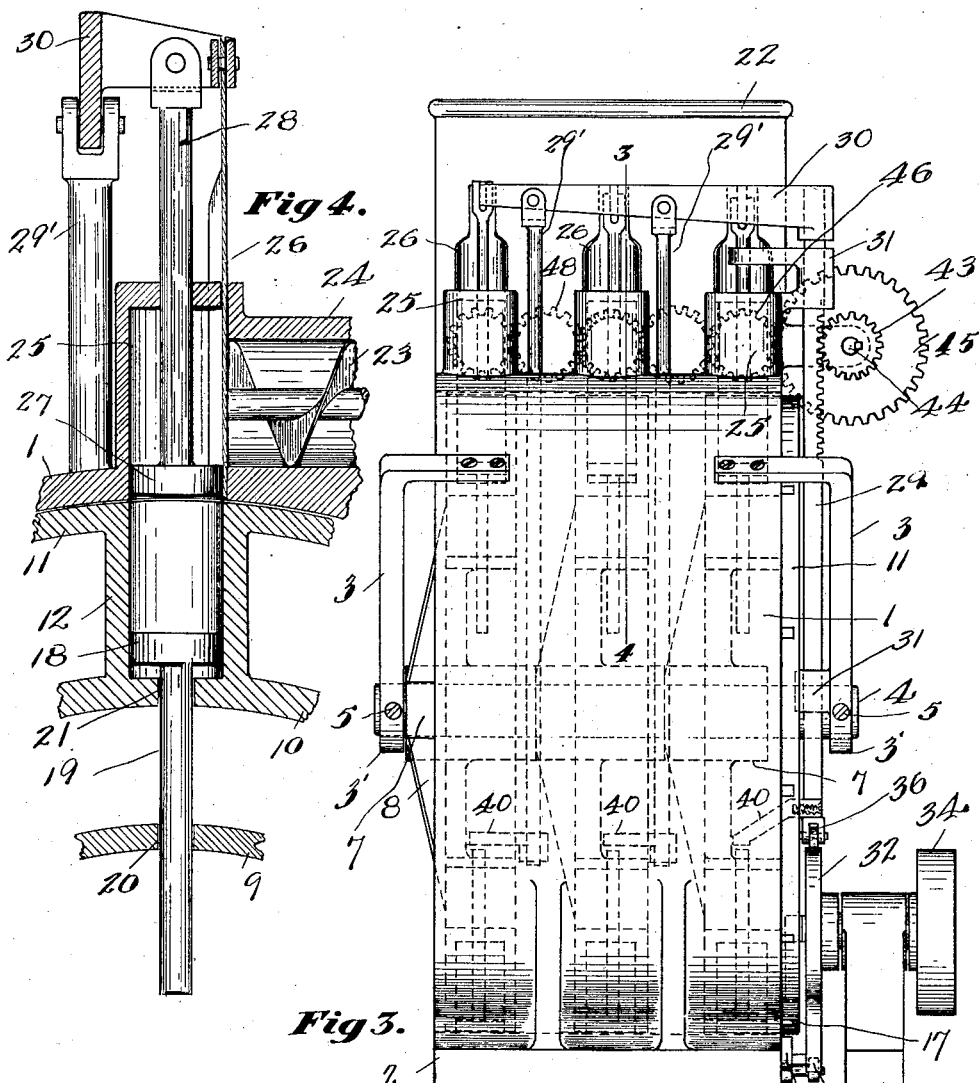

UNITED STATES PATENT OFFICE.

THOMAS FRISCHMANN, OF CLEVELAND, OHIO.

BREAD-MAKING MACHINE.

1,057,231.  Specification of Letters Patent.  Patented Mar. 25, 1913.

Application filed October 3, 1911. Serial No. 652,502.

*To all whom it may concern:*

Be it known that I, THOMAS FRISCHMANN, a citizen of the United States, residing at 9104 Shepherd avenue, Cleveland, in the county of Cuyahoga and State of Ohio, have invented certain new and useful Improvements in Bread-Making Machines, of which the following is a specification.

The present invention relates to improvements in bread making machines, and is designed especially for the purpose of measuring dough for various sized biscuits or pastry.

The object of the invention is the provision of a machine of this character which will perform the functions for which it is designed, in accurate manner, and this purpose is accomplished by utilizing a hopper in which is a suitable supply of dough, from whence the dough is automatically conveyed, measured, and the measured quantity of dough then carried to and deposited in a suitable receptacle.

The invention consists in certain novel features of construction and combinations and arrangements of parts as hereinafter described and set forth in the accompanying claim.

In the drawings I have illustrated one example of the physical embodiment of my invention constructed according to the best mode I have so far devised for the practical application of the principles.

Figure 1 is a front elevation of a machine embodying the novel features of my invention. Fig. 2 is a fragmentary detail sectional view on line 1—2 Fig. 1. Fig. 3 is an end elevation of Fig. 1, and Fig. 4 is an enlarged sectional view on line 3—4 Fig. 3.

The invention is capable of exemplification and adaptation to a considerable degree, within limits, and I have herein illustrated a machine which embodies three sets of measuring machines, one only of which will be described in detail inasmuch as the description of one set applies equally well to the others.

The entire machine is supported within the circular casing 1, provided with the base 2, and hangers or brace arms 3, 3, the latter having formed integral therewith the hub or bearing ring 3', located at the center of the machine. There are two pairs of these brace arms 3, one at each side of the machine, and likewise two opposing hubs or bearing rings 3'. The bearing rings or hubs 3' support the shaft or axle 4 which is fixed in the rings 3' by means of screws 5, 5, as clearly seen in Fig. 3.

Upon the axle 4, the revoluble carrier ring 6 is rotated by suitable power. This carrier ring comprises a hub 7 from which radiates the spokes, 8, joining the integral guide rings 9 and 10, and the guide ring 10 is joined to an outer ring 11 by means of a series of integral, cylindrical receptacles, forming open end chambers 12. I have illustrated a machine embodying three series or sets of these chambers 12, and each set comprises twelve of the receptacles, but it will be understood of course that the number of receptacles may be varied as desired within limits and to suit certain circumstances. The carrier ring 6 is revoluble in the direction of the arrow in Fig. 1, and reverse movement is prevented by action of the gravity pawl or dog 13 pivoted at 13' on the cam wheel 32, to be described. The rotation of this cam wheel imparts a step by step movement to the carrier and as the carrier revolves the pawl rides back upon the incline 14 on the outside ring 11 of the carrier, until a shoulder or notch 15 is encountered. Thus the pawl revolves the carrier ring one notch to every revolution of the cam 32. The revolution of the carrier is positively stopped and locked by means of the hook or latch 16 actuated by the cam wheel 32. The latch is adapted to project into one of a series of twelve openings or recesses 17 located in the outside ring 12 midway between each pair of receptacles.

Each receptacle or chamber 12 is provided with a plunger 18, whose stem 19 projects through the openings 20 and 21 formed in the guide rings 9 and 10 respectively of the carrier 6. The mixed dough is fed to the receptacles from the hopper 22 by means of the automatic screw conveyer 23 which rotates in the trough or neck 24 formed at the top of the casing 1. The casing is also provided with a receiving chamber 25 which communicates with the trough or neck 24 formed at the top of the casing 1, as described and shown, and the receiving chamber may be separated from the trough by means of the slide or gate 26 which is vertically reciprocable. Within the receiving chamber 25 a plunger 27, whose stem 28 is connected to a reciprocable member, is adapted to vertically reciprocate for a purpose to be described. The reciprocable member referred to is the rack bar or rod 29 provided with a cross beam 30, and each stem and slide gate is connected thereto and reciprocated thereby. The rack bar 29 is guided in its movement in the bearing or guide lugs 31, and is positively lifted by means of the cam wheel 32, which latter is fixed on driven shaft 33, and rotated therewith by means of the pulley 34. The down stroke of the rack bar is provided for by the abrupt shoulder 35 on the cam 32. Thus the slide gate 26 and plunger 27 are reciprocated from the cam 32, the lift being effected as the anti-friction wheel 36 rides upon the flat surface 37 of the cam, and the parts remaining in elevated position until the wheel 36 has ridden over the curved surface 38 of the wheel, whereupon the friction wheel 36 and rack bar fall over the shoulder 35 permitting a down stroke of the gates and plungers. The descending rack bar 29 and the complementary bars 29, 29' actuate the plungers 18 to expel the contained measured quantity of dough from the chambers or receptacles 12, each bar 29 and 29' having a tappet 40 secured at its lower end, to contact with the free end of the stems 19. Cam wheel 32 also holds the locking latch 16 in inoperative position as desired, by contact with the anti-friction wheel 41 journaled on the pivoted latch, a spring 42 serving to urge the latch into engagement with its complementary recess 17.

The conveyer 23 is operated from the rack bar by means of the rack wheel 43, shaft 44, and large gear wheel 45 which meshes with the smaller wheel 46 on the conveyer shaft. By means of the clutch 47 on shaft 44 forward movement of the conveyer, only, is permitted, and the additional conveyers are operated by the train of gears 48 as will be readily understood.

The scraper 6' is adapted to clear dough from the periphery of the carrier, as it revolves, thus keeping the machine in sanitary condition.

The number of dozens of quantities of dough measured may be indicated by a suitable register 49, which is actuated from the rotating carrier by means of the finger or lug 50.

To vary the quantity of dough admitted to the receiving chamber and to the receptacles different sized cam wheels may be used to change the travel of the bar 29, as desired. It will be understood that one or more carrier rings may be operated or built into a machine, but in any event the parts will be actuated from the one cam wheel 32. By removing a desired intermediate gear, the conveyer to which said gear is connected when in use, may be rendered inoperative and thrown out of use. These and other colorable changes are of course understood to be within the scope of my invention as set forth in my appended claim.

In operation, it being understood that all parts of the machine are actuated from the cam wheel 32, mixed dough is supplied to the hopper 22 from which it is conveyed to the receiving chamber by screw 23. The movement of the parts are so timed that as the actuating cam holds the plunger 27 and gate 28 elevated, the mixed dough is fed into the chamber 25. The continued rotation of the cam permits the descent of the rack bar and with it the gate and plunger in the chamber 25. This movement cuts off the supply to the receiving chamber, and at the same time expels the dough from chamber 25 into the alined receptacle 12 of the carrier 6, i. e. the uppermost chamber. The carrier is rotated in the direction of the arrow, by the cam wheel and pawl, with a step by step movement, and this action brings the loaded receptacles, successively to the lowermost position, diametrically opposite the loading point. The exact position of the receptacles to be unloaded is fixed by the action of the cam upon the latch 16, the latch being permitted to enter the locking recess as the wheel 41 drops over the shoulder 35 of the cam. At the proper time the tappet 40 contacts with and bears down upon the end of the stem 19, and by means of the plunger 18 forces the measured dough into a suitable receptacle.

From the above description taken in connection with the drawings it is evident that I have provided a machine which will perform the functions set forth as the objects and purposes of my invention.

While I have illustrated only one form of the physical embodiment of my invention, it is apparent that minor changes may be made without departing from the spirit of my claim.

Having thus fully described my invention what I claim as new and desire to secure by Letters Patent is:—

In a bread making machine, the combination with a feed hopper and a receiving chamber communicating therewith, a gate to close communication between said hopper and chamber and an ejector in the chamber, of a revoluble carrier comprising a series of receptacles, a plunger in each receptacle having its stem projected therefrom, a reciprocable bar connected to said gate, a tappet on the bar to engage said plunger stems, a driven shaft, and a cam wheel on said shaft actuating said bar.

In testimony whereof I affix my signature in presence of two witnesses.

THOMAS FRISCHMANN.

Witnesses:
 A. H. EARL,
 H. A. BROWN.